(12) United States Patent
Hanley

(10) Patent No.: US 7,805,822 B2
(45) Date of Patent: Oct. 5, 2010

(54) PROCESS FOR REMOVING THERMAL BARRIER COATINGS

(75) Inventor: Gary Lynn Hanley, Hobe Sound, FL (US)

(73) Assignee: Turbocombustor Technology, Inc., Stuart, FL (US)

( * ) Notice: Subject to any disclaimer, the term of this patent is extended or adjusted under 35 U.S.C. 154(b) by 367 days.

(21) Appl. No.: 10/736,019

(22) Filed: Dec. 15, 2003

(65) Prior Publication Data

US 2005/0126001 A1 Jun. 16, 2005

(51) Int. Cl.
*B21C 43/00* (2006.01)

(52) U.S. Cl. ............... 29/81.09; 29/889.1; 29/889.721; 29/557; 427/273; 134/22.12; 451/38; 451/61

(58) Field of Classification Search ............... 29/889.1, 29/889.721, 81.09, 557, 458; 427/331, 140, 427/142, 273; 134/22.12, 22.13, 30; 451/38, 451/61

See application file for complete search history.

(56) References Cited

U.S. PATENT DOCUMENTS

| | | | | |
|---|---|---|---|---|
| 4,020,535 A * | 5/1977 | Cuneo et al. ................... 445/49 |
| 4,402,992 A | 9/1983 | Liebert |
| 5,230,185 A * | 7/1993 | Kirschner et al. ............. 451/38 |
| 5,681,616 A | 10/1997 | Gupta et al. |
| 5,702,288 A | 12/1997 | Liebke et al. |
| 5,722,579 A * | 3/1998 | Yu et al. ...................... 228/119 |
| 5,863,360 A * | 1/1999 | Wood et al. .................. 148/561 |
| 5,976,265 A * | 11/1999 | Sangeeta et al. ............... 134/3 |
| 6,004,620 A | 12/1999 | Camm |
| 6,210,488 B1* | 4/2001 | Bruce ............................ 134/1 |
| 6,234,872 B1* | 5/2001 | Shaw .......................... 451/36 |
| 6,329,015 B1 | 12/2001 | Fehrenbach et al. |
| 6,333,069 B1 | 12/2001 | Beeck |
| 6,368,060 B1 | 4/2002 | Fehrenbach et al. |
| 6,490,899 B2* | 12/2002 | Berthelet et al. ............... 72/53 |
| 6,494,960 B1 | 12/2002 | MacDonald |
| 6,524,395 B1 | 2/2003 | Devine, II |
| 6,544,346 B1 | 4/2003 | Grossklaus et al. |
| 6,573,474 B1* | 6/2003 | Loringer ................. 219/121.71 |
| 6,620,457 B2 | 9/2003 | Farmer et al. |
| 6,663,919 B2* | 12/2003 | Farmer et al. ............... 427/453 |
| 6,878,041 B2* | 4/2005 | Esser et al. ................... 451/39 |
| 7,622,160 B2* | 11/2009 | Gupta et al. ................. 427/448 |
| 2001/0001680 A1 | 5/2001 | Farmer et al. |

(Continued)

FOREIGN PATENT DOCUMENTS

EP 0761386 B1 3/1997

(Continued)

OTHER PUBLICATIONS

Installation, Operating and Maintenance Instruction Manual, Model RSSA8, Guyson Corporation of USA, Saratoga Springs, NY 12866, Copyright 1999.

*Primary Examiner*—Essama Omgba
(74) *Attorney, Agent, or Firm*—Buckingham, Doolittle & Burroughs, LLP

(57) ABSTRACT

A process which uses an air jet containing non-abrasive particulate media at a low pressure which selectively removes thermal barrier coatings from components without damaging the metallic substrate. This process selectively removes thermal barrier coatings from the cooling holes of components.

25 Claims, 1 Drawing Sheet

U.S. PATENT DOCUMENTS

| | | |
|---|---|---|
| 2001/0006707 A1 | 7/2001 | Farmer et al. |
| 2003/0026952 A1 | 2/2003 | Fried |
| 2003/0037436 A1* | 2/2003 | Ducotey et al. ............ 29/889.1 |
| 2003/0052424 A1* | 3/2003 | Turner et al. ............... 264/1.32 |
| 2003/0148710 A1* | 8/2003 | Esser et al. .................... 451/39 |
| 2003/0165621 A1 | 9/2003 | Farmer |
| 2004/0075039 A1* | 4/2004 | Dubey et al. ................ 249/134 |
| 2004/0115447 A1 | 6/2004 | Farmer |
| 2005/0059321 A1 | 3/2005 | Bublath et al. |
| 2005/0161439 A1* | 7/2005 | Wustman et al. ............ 216/103 |
| 2005/0244274 A1 | 11/2005 | Wustman |
| 2006/0016191 A1* | 1/2006 | Woodcock et al. ............ 60/754 |
| 2008/0085395 A1* | 4/2008 | Fernihough et al. ......... 428/131 |

FOREIGN PATENT DOCUMENTS

| | | |
|---|---|---|
| EP | 1103627 A2 | 5/2001 |
| EP | 1103627 A3 | 12/2002 |
| EP | 1275749 A1 | 1/2003 |
| EP | 0916445 B1 | 5/2003 |
| EP | 1317995 A1 | 6/2003 |
| EP | 1340587 A2 | 9/2003 |
| JP | 2000096240 | 4/2000 |
| WO | WO 9011163 | 11/1990 |

* cited by examiner

PROCESS FOR REMOVING THERMAL BARRIER COATINGS

BACKGROUND OF THE INVENTION

The present invention relates generally to a process for removing thermal barrier coatings from metal components and more particularly to a method for removing a thermal barrier ceramic coating from the cooling holes of a gas turbine engine component, such as a combustor chamber liner.

Gas turbine engines (aerospace and industrial) are designed such that their nickel and cobalt based superalloy components operate at temperatures very close to their melting points. Thermal barrier coatings (TBC) perform the important function of insulating components operating at elevated temperatures. Typical turbine components are combustion chamber (see combustion chamber 10 in FIG. 1), ducts, discharge nozzles, turbine blades and nozzle guide vanes. TBCs are characterized by their very low thermal conductivity, the coating bearing a large temperature gradient when exposed to heat flow.

The most commonly applied TBC material is yttria stabilized zirconia (YSZ), which exhibits resistance to thermal shock and thermal fatigue up to 1150 degrees C. Typically the ceramic layer can be deposited by air plasma spraying (APS), low pressure plasma spraying (LPPS) or a physical vapor deposition (PVD) process, such as electron beam physical vapor deposition (EBPVD). It is common practice to pre-coat the substrate material with a bond coat. The bond coat accommodates residual stresses that might otherwise develop in the coating system, caused by the metallic substrate and the ceramic TBC having different coefficients of thermal expansion, as well as providing oxidation and corrosion resistance. Typical bond coats include, but are not limited to, MCrAlY, wherein M is Ni, Co, Fe or mixtures thereof, or a diffusion aluminide or platinum aluminide coating.

The desire to increase the efficiency of gas turbine engines has led to an increase in the temperature in the combustion chamber and the hot section of the turbine engine. In order to compensate for the additional temperature, effusion hole cooling is often used where there is a significant heat load. Effusion hole cooling of an engine component, such as a combustion chamber 10 as shown in FIG. 1, is accomplished by laser drilling small diameter (0.010 to 0.060 inch diameter) cooling holes 11 at specific angles and patterns that deliver the required cooling air to the engine component. Effusion hole cooling systems are typically used in conjunction with TBC coatings on engine components in order to achieve maximum benefit resulting from their ability to sustain high thermal gradients. Lowering the temperature of the metal substrate prolongs the life of the engine component. In addition, these cooling hole and TBC systems reduce the thermal gradients in the metal substrate thereby reducing the driving force for thermal fatigue. The benefit of these systems is realized in greater component durability, higher gas temperature, performance and improved efficiency.

Laser drilling (e.g. Nd: YAG laser) is used to drill and manufacture cooling holes in gas turbine engine hot section components. These parts are preferably protected by thermal barrier coatings (TBC). The laser drilling process can manufacture the cooling holes by drilling through the component's metallic substrate and the TBC at the same time; however, laser induced damage occurs during this manufacturing process. Microstructural damage is generated at the TBC interface with the metallic bond coat and metallic substrate which results in TBC debonding and subsequent ceramic insulation coating loss (spallation) which is detrimental to the metallic substrate due to the high heat loads which adversely affects part durability and service life.

Various techniques have been developed to remove thermal barrier coatings from components during manufacture and repair, including air-cooled components. U.S. Pat. No. 6,004,620, EP 1340587 A2 and U.S. Pat. No. 6,620,457 B2 disclose a waterjet system with or without particulate media (abrasive or non-abrasive) utilizing a liquid-containing jet which operates at high fluid pressures ranging from 5000 pounds per square inch to 50,000 pounds per square inch in order to remove thermal barrier coating deposits. The waterjet process creates "minimal" wear and erosion of the underlying substrate after only a single cycle at 5000 pounds per square inch pressure. Additional cycles and/or increased pressures provides wear and erosion beyond what is considered minimal.

SUMMARY OF THE INVENTION

Briefly, the present invention provides a process which uses an air jet containing non-abrasive particulate media at a low pressure which selectively removes thermal barrier coatings from components without damaging the metallic substrate. This process selectively removes thermal barrier coatings from the cooling holes of components.

DETAILED DESCRIPTION OF THE INVENTION

Figure 1:
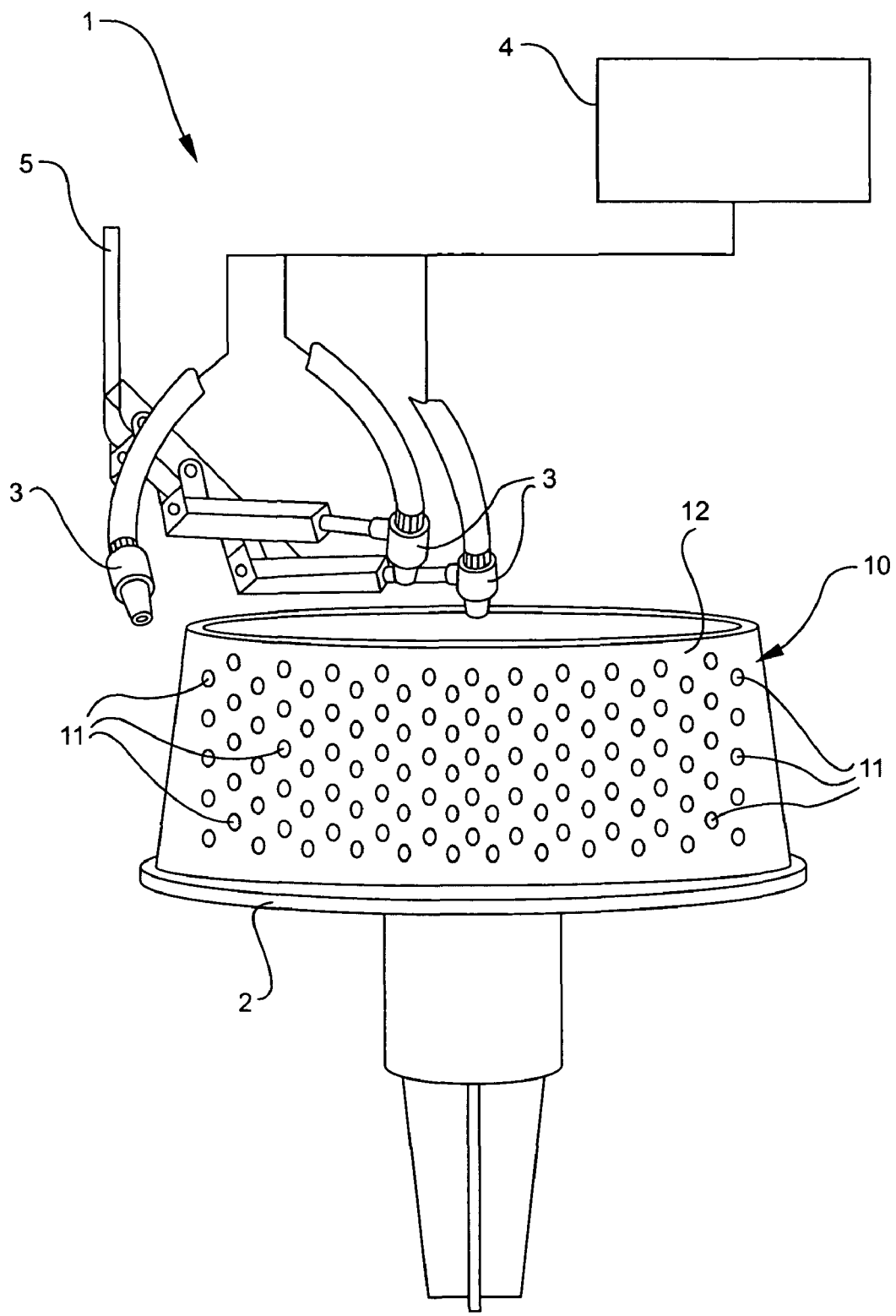
FIG. 1 represents a side view of the apparatus used to carry out the process of this invention.

The present invention provides a process which utilizes a low pressure air-only jet with non-abrasive particulate media which is effective for the removal of thermal barrier coating deposits and does not result in wear erosion of the underlying metal substrate due to the low pressure process air and the inherent characteristics of the non-abrasive media that is used. The present process can be used an unlimited number of times on a component without significant wear and erosion.

This process utilizes a non-abrasive particulate media, preferably a dry spherical bead medium, under controlled low pressure air which effectively machines and removes thermal barrier coatings without adversely affecting the component metallic substrate. This process is effective in removing TBC coating that can be deposited in or on component features including, but not limited to, effusion air cooling holes and air cooling holes in general, as well as any component feature where TBC is not required or desired.

This process enables components to be manufactured or repaired by a laser drilling process (if required) which produces or restores air cooling holes prior to application or restoration of the thermal barrier coating. A primary beneficial attribute of this process is the ability to apply the thermal barrier coating after any required laser hole drilling thereby eliminating the laser induced damage which contributes to TBC loss (spallation) and subsequent thermal damage or distress to the component metallic substrate which adversely affects part durability and service life.

An additional benefit of this process is the surface enhancement of air cooling hole interiors and hole edges by smoothing and rounding any rough or sharp edges which significantly improves the airflow characteristics of the air cooling holes. Airflow testing of a combustion chamber wall has demonstrated a 14.6 percent increase of mass airflow after this process. Airflow test results of a combustion chamber liner wall after laser drilling and deburring showed a mass flow rate of 0.333093 LBM/S, (pounds per second mass flow) while airflow test results of the same wall after TBC application and use of this process showed a part mass flow rate of 0.382348 LBM/S.

The process is carried out using a dry air blast system 1 as shown in FIG. 1 consisting of, but not limited to, an enclosure (not shown), rotary table 2, multiple air jet nozzles 3, a dry air supply pressure vessel and media processing unit 4, a mechanism for air jet nozzle movement 5, a media processing/recovery unit for filtration and spherical particle separation (not shown), and a programmable controller (not shown). The dry air jet system apparatus utilizes a media recovery unit which provides continuous media filtration and spherical particle separation during the process in order to maintain the efficiency of the process and produce the optimum surface enhancement in and adjacent to air cooling holes which is desirable in order to increase the discharge coefficient of the air cooling hole.

The process employs an air-only delivery system at a low pressure, preferably about 20 pounds per square inch (PSIG) to about 100 PSIG to flow a concentrated stream of non-abrasive particulate media to the work area in order to machine away and remove thermal barrier coating deposits without adversely affecting the component's metallic substrate surface. The preferred non-abrasive media is a spherical media with at least 70%, preferably at least 95% the particles at a size in the range of about 0.002 to 0.010 inch (about 0.05 to 0.25 millimeters) diameter. Spherical glass media at a size of about 0.003 inch diameter can be used as the non-abrasive media.

Due to varying component geometry and design, the dry air jet system nozzle(s) may be articulated in any manner in order to achieve any position required to deliver the concentrated stream of spherical media to the work area in order to machine away and remove thermal barrier coating deposits from the component including but not limited to the interior, edges and surfaces of air cooling holes at varying angles of incidence. A manual dry air blast nozzle can also be utilized as required to perform the process. In removing the TBC from cooling holes the air jet can be directed at the cooling hole toward the surface opposing the surface having the thermal barrier coating, e.g. with a combustion chamber 10 shown in FIG. 1 with a TBC coating on the exterior surface 12 the air jet would be directed at the cooling holes 11 from the interior surface. In addition to remove TBC from the cooling hole the air jet is aligned coaxially with the axis of the cooling hole (i.e. at substantially the same angle as the cooling hole).

The present invention can be applied to thermal barrier coated components during manufacture or repair. For the manufacture of new components, TBC can be applied after all other processing has been completed, including after laser drilling and machining. Since TBC application can be accomplished as one of the final manufacturing processes utilizing the present invention, the quality and integrity of the TBC applied to the component is ensured and will possess the same quality level and characteristics as the representative test coupon that is normally processed with the component during TBC application. During component manufacture, this process can be used to remove TBC as required in order to accomplish any modification and/or repair which may be required to produce the component. For the repairs of service components, this process can be used to carefully remove TBC in order to prepare the part for inspection and repair. After repair processing is complete, including but not limited to welding, grinding, heat treatment and laser drilling and machining, the TBC can be reapplied and this process used as required to remove any unwanted TBC.

The air-only low pressure-media bead blast-hone process is a controlled system which uses very small diameter (in the 0.003 inch diameter range) spherical media at low air pressures in the range of about 20 PSIG to 100 PSIG for most TBC removal applications. Some TBC removal applications may require process parameter and/or media changes without departing from the scope of the claimed invention. The process is non-aggressive and does not cause wear or erosion to metallic substrates, is economical and produces consistent results. Airflow testing of cooling holes after application of this process has also demonstrated significantly improved component airflow characteristics.

EXAMPLE

A jet engine hot section combustion chamber (manufactured from a cobalt or nickel based superalloy material) is manufactured having air cooling holes laser drilled therein. The gas path (hot side) surface of the component is first coated with a metallic bond coat which is predominantly nickel and containing chromium, aluminum and yttria (or another reactive element). The metallic bond coat is applied by plasma spraying to a thickness which is typically about 0.005 to 0.008 inch (about 0.13 to 0.020 mm). After bond coat application, the air cooling holes are manufactured utilizing a laser drilling process to create the desired angle of incidence in order to achieve the required air flow cooling characteristics for the component. After laser drilling, the component is cleaned to remove any laser slag or displaced material resulting from the laser drilling process. After laser drilling and cleaning, an optional bond coat layer of the same material can be applied by the plasma spray process to a thickness of about 0.001 to 0.003 inch. A ceramic top-coat layer which is predominantly zirconia partially stabilized with 6 to 8 percent of yttria is then applied by a plasma spray process to a thickness of about 0.005 to 0.020 inch (about 0.13 to 0.50 mm). During the application of the ceramic top-coat layer, the component's air cooling holes are partially blocked by the thermal barrier coating (ceramic top-coat layer) thereby restricting cooling air flow.

A Guyson Dry Air Blast System Model RSSA-8 configured as shown in FIG. 1 is used to provide a dry air jet at a pressure of 40 to 60 PSIG utilizing spherical glass media in the 0.003 inch diameter range (at least 70 percent of the spherical particles possess a diameter of 0.003 inch). The dry air jet is directed to the metallic surface side (non-coated) of the component (opposing the thermal barrier coated surface) at substantially the same angle of incidence as the air cooling hole to remove the thermal barrier coating deposits restricting cooling air flow.

The thermal barrier coating deposits are completely removed from the air cooling holes thereby providing the desired cooling air flow required for the component. In addition, the air cooling holes surfaces and edges are conditioned (smoothed and rounded) providing an approximate 15 percent increase in mass air flow by increasing the discharge coefficient of the air cooling holes.

What is claimed is:

1. A process for removing a thermal barrier ceramic coating from a cooling hole of a component comprising:

drilling cooling holes into the component after a bond coat application and prior to a thermal barrier ceramic coating application;

coating the component containing the cooling holes with the thermal barrier ceramic coating;

directing an air jet at a side of the component, opposing a surface having the thermal barrier ceramic coating, the jet containing a non-abrasive spherical particulate media and emitting the media from a nozzle of the jet at a low pressure wherein said low pressure is insufficient for the media to damage a substrate but said low pressure is sufficient for the media to remove the thermal barrier ceramic coating from the cooling hole; and wherein a bond coating is interposed between the thermal barrier ceramic coating and the substrate; and wherein the pressure of the air jet is from about 20 to 100 PSIG and wherein continuous media filtration and spherical particle separation are provided during the process.

2. The process of claim 1 wherein the spherical media particles have a diameter of from about 0.002 to 0.010 inches.

3. The process of claim 2 wherein the media is glass beads.

4. The process of claim 1 wherein the component is a turbine engine component.

5. The process of claim 4 wherein the turbine engine component is a combustion chamber or related turbine engine component.

6. The process of claim 1 wherein said bond coating is a MCrAlY coating and wherein M is selected from the group consisting of Ni, Co, Fe and mixtures thereof.

7. The process of claim 1, wherein said thermal barrier ceramic coating is not degraded or damaged.

8. A process for removing a thermal barrier ceramic coating selectively from a cooling hole of a metallic turbine engine component consisting essentially of:

drilling cooling holes into the turbine component after a bond coat application and prior to a thermal barrier ceramic coating application;

coating the component containing the cooling holes with the thermal barrier ceramic coating;

directing an air jet at the cooling hole of the component, wherein the air jet is directed to a side, opposing a surface having the thermal barrier ceramic coating, the jet containing non-abrasive particulate spherical media and emitting the media from a nozzle of the jet at a low pressure wherein said low pressure is sufficient to selectively remove said thermal barrier ceramic coating yet insufficient for the media to damage an underlying metallic substrate of the cooling hole; and wherein a bond coating is interposed between the thermal barrier ceramic coating and the metallic substrate; and wherein the pressure of the air jet is from about 20 to 100 PSIG and wherein continuous media filtration and spherical particle separation are provided during the process.

9. The process of claim 8 wherein the spherical media particles have a diameter of from about 0.002 to 0.010 inches.

10. The process of claim 9 wherein the media is glass beads.

11. The process of claim 10 wherein the turbine engine component is a combustion chamber or related turbine engine component.

12. The process of claim 8 wherein the air jet is directed at the cooling hole at substantially the same angle as the cooling hole.

13. The process of claim 8 wherein the air jet with the spherical media rounds the metallic edges of the cooling hole.

14. The process of claim 8 wherein the cooling holes are drilled into the turbine component using a laser drilling process.

15. The process of claim 8 wherein said bond coating is a MCrAlY coating and wherein M is selected from the group consisting of Ni, Co, Fe and mixtures thereof.

16. The process of claim 8, wherein said thermal barrier ceramic coating is not degraded or damaged.

17. A process for forming cooling holes on a thermal barrier ceramic coated turbine engine component comprising:

drilling cooling holes into the component after a bond coating application;

coating the component containing the cooling holes with a thermal barrier ceramic coating; and directing an air jet at the cooling hole of the component, wherein the air jet is directed to a side of the component, opposing a surface having the thermal barrier ceramic coating, the jet containing non-abrasive particulate spherical media and emitting the media from a nozzle of the jet at a low pressure wherein said low pressure is sufficient to selectively remove said thermal barrier ceramic coating yet insufficient for the media to damage an underlying metallic substrate of the cooling hole; and wherein the bond coating is interposed between the thermal barrier ceramic coating and the metallic substrate; and wherein the pressure of the air jet is from about 20 to 100 PSIG and wherein continuous media filtration and spherical particle separation are provided during the process.

18. The process of claim 17 wherein the spherical media particles have a diameter of from about 0.002 to 0.010 inches.

19. The process of claim 18 wherein the media is spherical glass beads.

20. The process of claim 19 wherein the turbine engine component is a combustion chamber or related turbine engine component.

21. The process of claim 17 wherein the air jet is directed at the cooling hole at substantially the same angle as the cooling hole.

22. The process of claim 17 wherein the air jet with the spherical media rounds the metallic edges of the cooling hole.

23. The process of claim 17 wherein the cooling holes are drilled through the turbine component using a laser drilling process, wherein the cooling holes are drilled after bond coat application and prior to thermal barrier ceramic coating application.

24. The process of claim 17 wherein said bond coating is a MCrAlY coating and wherein M is selected from the group consisting of Ni, Co, Fe and mixtures thereof.

25. The process of claim 17, wherein said thermal barrier ceramic coating is not degraded or damaged.

* * * * *